United States Patent

[11] 3,621,342

| [72] | Inventors | Susumu Yoshimura;<br>Katsue Hasegawa; Yoshio Yamamoto; Iwao Tajima, all of Osaka, Japan |
|---|---|---|
| [21] | Appl. No. | 47,475 |
| [22] | Filed | June 18, 1970 |
| [45] | Patented | Nov. 16, 1971 |
| [73] | Assignee | Matsushita Electric Industrial Company, Limited<br>Osaka, Japan |
| [32] | Priorities | June 20, 1969 |
| [33] | | Japan |
| [31] | | 44/49872;<br>June 27, 1969, Japan, No. 44/51989 |

[54] SOLID EKECTROLYTIC CAPACITOR WITH $\gamma\text{-}M_nO_2$ ELECTROLYTE
14 Claims, 1 Drawing Fig.

[52] U.S. Cl. ..................................... 317/230, 29/570
[51] Int. Cl. ...................................... H01g 9/05
[50] Field of Search ............................ 317/230, 231, 233, 238

[56] References Cited
UNITED STATES PATENTS

| 3,054,029 | 9/1962 | Wagner et al. ............... | 317/230 |
| 3,320,484 | 5/1967 | Riley et al. .................. | 317/101 |
| 3,320,494 | 5/1967 | Riley ........................... | 317/230 |

*Primary Examiner*—James D. Kallam
*Attorney*—John Lezdey

ABSTRACT: A solid electrolytic capacitor including a first electrode having formed an oxide film on its outer surface, a second electrode disposed opposite to the first electrode and a solid electrolyte composed substantially of granular manganese dioxide of gamma type and disposed in contact and between the first and second electrodes. The solid electrolyte has a high film-forming ability and is prepared by electrolyzing manganese sulfate dissolved in an aqueous solution of sulfuric acid. The solid electrolytic capacitor is capable of operating stably over a broad temperature range and for a prolonged period of time even when it is placed on use at a high-operating temperature.

PATENTED NOV 16 1971 3,621,342
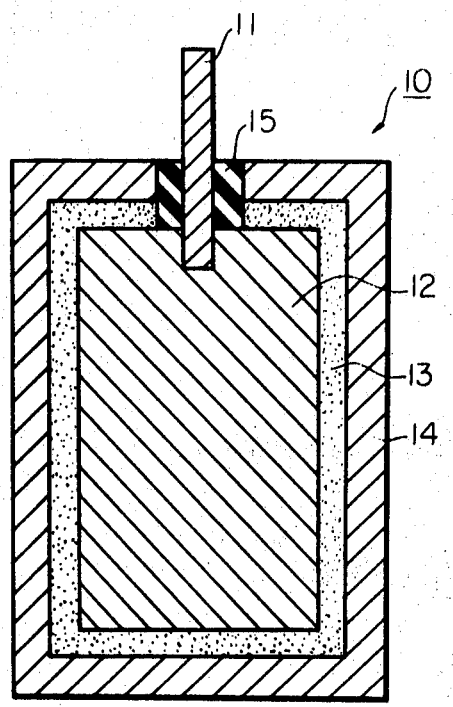
SUSUMU YOSHIMURA, KATSUE HASEGAWA, YOSHIO YAMAMOTO, IWAO TAJIMA INVENTORS
BY
John Leden ATTORNEY

SOLID ELECTROLYTIC CAPACITOR WITH $\gamma$-$M_nO_2$ ELECTROLYTE

This invention relates to a solid electrolytic capacitor of the type using an improved electrolyte, and particularly to a solid electrolytic capacitor in which manganese dioxide of gamma crystal type having a high film-forming ability is utilized as a solid electrolyte.

It is well known in the art that an extremely thin film of oxide which is obtained by oxidizing anodically the film formable metal (so-called valve metal) such as aluminum is often utilized in solid capacitors because of its excellent dielectric characteristics. Because, however, of the fact that a number of defects and pores will be produced easily in the film thus formed, serious problems are encountered by the increase leakage current and the deteriorated dielectric characteristics of the film. The electrolyte to be interposed between the anodic oxide film and the counter electrode (or cathode) of an electrolytic capacitor is required, as is also well known, to serve not only as a normal cathode but, in order that a defective film be reformed or healed, as an anodic oxidizer to the oxide film when in the anodic polarization.

The solid electrolytic capacitors presently commercialized mostly use manganese dioxide as an electrolyte. In order to have a solid electrolyte adhered to a valve metal having an oxide film thereon, it is necessary to process the electrolyte at an elevated temperature. If, for instance, it is desired to coat the oxide film with manganese nitrate for conversion into manganese dioxide by its thermal decomposition, the oxide film thus coated with manganese nitrate should heated to a temperature ranging from 200° to 400° C. For the purpose of coating the solid electrolyte to the oxide film, furthermore, the thermal decomposition should be repeated at least several times. The anodized film, which is known to be susceptible to destruction, undergoes a serious damage while it is being subjected to the thermal decomposition process, thus inviting a degraded dielectric characteristics.

It has been proposed in limited quarters that the leakage current in the conventional solid electrolytic capacitor can be reduced, if oxygen is continuously supplied by the electrolyte to the oxide film so as to remedy the defects which have been produced therein in the course of the thermal decomposition, or if the manganese dioxide is converted into a lower oxide of increased resistance by the Joule heat to be evolved due to the high current density at the defects.

Whichever process may be employed, however, complicated production schemes will be indispensable. An increase in the leakage current and a decrease in the operating voltage may also be taken into consideration as concomitant with these prior art processes.

An object of the invention is, therefore, to provide a solid electrolytic capacitor which is cleared of the drawbacks which have thus far been experienced in the conventional capacitors of the described type.

A more specific object of the invention is to provide a solid electrolytic capacitor using a solid electrolyte which is prepared in a new and novel manner so as to provide an increased self-reforming ability of the oxide film and a minimized leakage current.

A further object is to provide a method of manufacturing a solid electrolytic capacitor, wherein an electrolyte adheres to an oxide film without involvement of the thermal decomposition process; the solid electrolyte capacitor thus manufactured offers an increased operating voltage and improved dielectric characteristics.

Before entering into detailed description of the invention, general discussion will now be given to manganese dioxides employed in the invention as an electrolyte. Manganese dioxides occur with numerous crystal structures in various natural and artificial minerals and are known to be grouped, by an X-ray spectroscopic analysis, into the categories of $\alpha$-$MnO_2$, $\beta$-$MnO_2$, $\gamma$-$MnO_2$ and $\delta$-$MnO_2$. Of these, $\beta$-$MnO_2$ in particular is a manganese dioxide of its stoichiometric composition which usually occurs as pyrolusite and which is artificially obtained through thermal decomposition of manganese nitrate. This type of manganese dioxide is known to have the highest stability and the greatest electric conductivity. $\gamma$-$MnO_2$, on the other hand, is a generic of those manganese dioxides of the crystal phase within a certain range in which the crystals are only prematurely grown. The manganese dioxide of this type occurs naturally as ramsdellite and is artificially obtained in an electrolytic method. $\gamma$-$MnO_2$ is rather unstable in structure and as such is usually chemically active. $\gamma$-$MnO_2$ can, however, be stabilized in structure if the same is processed in boiled water and, if subjected to heat treatment at a temperature higher than about 300° C. in the atmospheric air, can be converted completely into $\beta$-$MnO_2$.

The manganese dioxides, which are presently used in the existing solid electrolytic capacitors, are said to have the ability of anodizing the valve metals. No reliable information is available as to how such anodizing ability depends upon the crystal structures of the manganese dioxides. We, therefore, conducted extensive experiments with the crystals of $\beta$ and $\gamma$ type, with the result that the high anodizing ability of $\gamma$-$MnO_2$ could be ascertained. In the experiments, two pellets were first prepared, one being a manganese dioxide ($\gamma$-$MnO_2$) obtained in the electrolytic method and the other being a manganese dioxide ($\beta$-$MnO_2$) obtained by heating the former manganese dioxide at 300° C. for 2 hours. A pure aluminum needle was erected on each of the thus prepared pellets and a constant anodic current was applied to the aluminum needle so as to observe the rise of anodic potential. The result for $\beta$-$MnO_2$ was that the increase in the final voltage was extremely small at the current density of as high as 500 ma./cm.$^2$. The resultant anodizing efficiency was estimated at about $10^{-7.6}$. The rise in the voltage of about 15 minutes later was 10 volts at the highest. The anodizing efficiency in $\gamma$-$MnO_2$ was observed to be noteworthy, showing about $10^{-7.3}$ to $10^{-7.5}$ on the average; the final voltage reached about 40 to 70 volts about 15 minutes later. It is to be noted in both cases that the anodic oxidation can not take place in the absence of moisture. As a matter of fact, no anodic oxidization was observed when a completely dried specimen was inspected in the stream of dry air.

On the basis of these findings, a new method of manufacturing a solid electrolytic capacitor using $\gamma$-$MnO_2$ as an electrolyte was discovered, which method is described in the following.

As will be appreciated, the gist of the invention resides in that $\gamma$-$MnO_2$ in the colloidal state is applied to a thin oxide film formed on the anode electrode so as to enable the electrolyte to closely adhere to the oxide film without resort to a thermal decomposition process of an electrolytic material.

The FIGURE in the accompanying drawing is a vertical sectional view showing diagrammatically an embodiment of the electrolytic capacitor according to the invention.

As shown in the drawing, the solid electrolytic capacitor 10 comprises a lead electrode 11, a first electrode 12 having formed an oxide film on its outer surface and electrically connected to the lead electrode 11, a solid electrolyte 13 composed substantially of granular manganese dioxide of $\gamma$ type and covering the first electrode 12, and a second electrode 14 disposed opposite to the first electrode 12 and covering the solid electrolyte 13. If desired, the solid electrolytic capacitor 10 may further comprise an insulator 15 disposed around the lead electrode 11 for electrically disconnecting the second electrode 14 therefrom and for sealing off the particular portion. The first electrode 12 may be made of a sintered porous or etched valve metal such as aluminum or tantalum, depending upon the application.

The manganese dioxide which is operable according to this invention is obtained by electrolyzing manganese sulfate dissolved in an aqueous solution of sulfuric acid in the concentration of 0.2 to 1.0 mole of $MnSO_4$ in one normal solution of $H_2SO_4$. Not only $\gamma$-$MnO_2$ but also $\alpha$-$MnO_2$ and $Mn_2O_3$ are derived as a result of such electrolyzation but the manganese dioxide to be operable as the solid electrolyte in the method of the invention is limited to that which contains 80 percent or more of $\gamma$-MnO$_2$. The manganese dioxide obtained by the electrolyzation is then washed in water, dried and comminuted into five particles. The resultant particles are then sieved by a filter of 325 mesh so that finer particles of about 40 micron grain size are obtained. If, in this instance, the resultant particles of $\gamma$-MnO$_2$ of 325 mesh are further pulverized in an agate mortar for about 48 hours, then particles of manganese dioxide of about 0.1$\mu$ grain size will result.

The thus prepared fine particles are then dispersed in a suitable liquid such as water or alcohol at 20 to 30 percent of weight. A formed valve metal is, then, impregnated with the colloidal solution of the manganese dioxide in the atmospheric air or in a vacuum and is thereafter dried in the open air. If the valve metal is dried at too high a temperature or if a moisture prevails around the valve metal being dried, then crystal dislocation of $\gamma$-MnO$_2$ will take place. To avoid this, the valve metal may be preferably dried in such a manner that: the colloidal solution is evaporated at 70° C. temperature for about 30 minutes (or about 5 minutes if the valve metal is dried in a vacuum) and thereafter the valve metal is heated at a temperature lower than 150° C. for about 30 minutes. Such heat treatment is intended to have the solution in the $\gamma$-MnO$_2$ evaporated and to have the fine particles of the $\gamma$-MnO$_2$ adhered to the oxide film of the formed valve metal. As a consequence, this oxide film is not subjected to serious destruction in the course of the heat treatment. Experiments conducted by us have revealed that a solid electrolytic capacitor, in which the granular $\gamma$-MnO$_2$ is adhered to an etched or sintered aluminum anode electrode (of 0.64 $\mu$F capacitance in a liquid phase) anodized up to 50 volts with an electrolyte of a boric acid or borate family, has the capacitance of 0.61 $\mu$F when an operating voltage of 40 volts is applied; the leakage current was observed to decrease to about 10$\mu$A about 30 minutes after the voltage had been applied.

It was also found that the electrolyte prepared in a manner previously described can be securely adhered to the oxide film even in a solid electrolytic capacitor of sintered tantalum and aluminum.

According to the invention, therefore, a solid electrolytic capacitor can be obtained which provides a reduced leakage current and increased operating voltage owing to the increased anodizing efficiency of the $\gamma$-MnO$_2$ used. Since, moreover, the thermal decomposition process is dispensed with in the manufacture of the electrolytic capacitor implementing the invention, the oxide film to be processed is free from being damaged seriously. This will contribute to simplifying the schemes of manufacturing a solid electrolytic capacitor because of the omission of the reforming or healing step and eventually to improvement of the performance quality of the final capacitors.

It should be understood that the scope of this invention is not limited to the embodiment which has been described and shown herein and especially that the valve metal, which has been exemplified in aluminum and tantalum, may be any of titanium, niobium, hafnium, yttrium and other similar chemical element.

We claim:

1. Method for preparing a solid electrolytic capacitor having a dielectric oxide film on the surface of the anode electrode comprising the steps of providing a solid electrolyte material composed substantially of granular manganese dioxide of $\gamma$ type, dispersing said material in a liquid to form a colloidal solution and applying the solution to the oxide film of the anode electrode and drying the resultant layer thereby producing a solid electrolyte on said film.

2. Method according to claim 1, wherein said liquid is water.

3. Method according to claim 1, wherein said liquid is alcohol.

4. Method according to claim 1, wherein said material is prepared by electrolyzing manganese sulfate dissolved in an aqueous solution of sulfuric acid.

5. Method according to claim 4, wherein the concentration of said manganese sulfate is 0.2 to 1.0 mole in one normal solution of sulfuric acid.

6. Method according to claim 1, wherein said solid electrolyte material contains more than 80 percent of $\gamma$-MnO$_2$ having grain size of about 0.1$\mu$ to 30$\mu$.

7. Method according to claim 6, further comprising the steps of washing said material in water, drying the washed material, comminuting the dried material into fine particles, sieving the comminuted particles with use of a filter of 325 mesh, pulverizing the sieved particles an agate mortar for about 48 hours, dispersing the pulverized finer particles in said liquid at 20 to 30 percent by weight to form a colloidal suspension, impregnating said anode electrode with the resultant dispersion, and drying again said anode electrode impregnated with said dispersion so as to adhere said material to said anode electrode and produce a solid electrolyte on said anode electrode.

8. Method according to claim 7, wherein said solid electrolyte is dried again in a manner that said dispersion is evaporated at a temperature of 70° C. for about 30 minutes in an atmospheric air and thereafter said anode electrode is heated at a temperature lower than 150° C. for about 30 minutes.

9. Method according to claim 7, wherein said solid electrolyte is dried again in a manner that said dispersion is evaporated at a temperature of 70° C. for about 5 minutes in a vacuum and thereafter said anode electrode is heated at a temperature lower than 150° C. for about 30 minutes.

10. A solid electrolytic capacitor comprising a first electrode having a dielectric oxide film on its outer surface, a second electrode disposed opposite to said first electrode and a solid electrolyte composed substantially of granular manganese dioxide of $\gamma$ type adhering to said dielectric film and disposed in contact with and between said first and second electrodes.

11. A solid electrolytic capacitor according to claim 10, further comprising a lead electrode connected electrically to said first electrode and an insulator disposed around said lead electrode for disconnecting electrically said second electrode therefrom.

12. A solid electrolytic capacitor according to claim 10, wherein said solid electrolyte contains more than 80 percent of $\gamma$-MnO$_2$ having grain size of about 0.1$\mu$ to 3.0$\mu$.

13. A solid electrolytic capacitor according to claim 10, wherein said first electrode is made of a sintered porous valve metal selected from the group consisting of aluminum tantalum, niobium, hafnium and yttrium.

14. A solid electrolytic capacitor according to claim 10, wherein said first electrode is made of an etched valve metal selected from the group consisting of aluminum, tantalum, titanium, niobium, hafnium and yttrium.

* * * * *